(12) United States Patent
Ortiz et al.

(10) Patent No.: US 11,578,668 B2
(45) Date of Patent: Feb. 14, 2023

(54) GAS TURBINE ENGINE CONTROL BASED ON CHARACTERISTIC OF COOLED AIR

(71) Applicant: United Technologies Corporation, Farmington, CT (US)

(72) Inventors: Jonathan Ortiz, El Centro, CA (US); Taryn Narrow, Glastonbury, CT (US); John H. Mosley, Portland, CT (US); Zachary Mott, Glastonbury, CT (US); Paul R. Hanrahan, Farmington, CT (US)

(73) Assignee: Raytheon Technologies Corporation, Farmington, CT (US)

(*) Notice: Subject to any disclaimer, the term of this patent is extended or adjusted under 35 U.S.C. 154(b) by 1193 days.

(21) Appl. No.: 15/608,293

(22) Filed: May 30, 2017

(65) Prior Publication Data

US 2018/0347472 A1 Dec. 6, 2018

(51) Int. Cl.
| | |
|---|---|
| F02C 9/18 | (2006.01) |
| F02C 7/143 | (2006.01) |
| F01D 5/08 | (2006.01) |
| F02C 9/28 | (2006.01) |
| F02C 7/18 | (2006.01) |
| F02C 6/08 | (2006.01) |

(52) U.S. Cl.
CPC ............... *F02C 9/18* (2013.01); *F01D 5/081* (2013.01); *F02C 7/143* (2013.01); *F02C 7/185* (2013.01); *F02C 9/28* (2013.01); *F02C 6/08* (2013.01); *F05D 2260/213* (2013.01); *F05D 2270/05* (2013.01)

(58) Field of Classification Search
CPC .................................... F02C 9/28; F02C 9/46
See application file for complete search history.

(56) References Cited

U.S. PATENT DOCUMENTS

| | | | |
|---|---|---|---|
| 5,255,505 A | 10/1993 | Cloyd et al. | |
| 5,996,331 A | 12/1999 | Palmer | |
| 8,240,153 B2 | 8/2012 | Childers et al. | |
| 8,277,169 B2* | 10/2012 | Riahi | F01D 5/081 |
| | | | 415/115 |
| 8,307,662 B2 | 11/2012 | Turco | |
| 8,707,709 B2 | 4/2014 | Davis, Jr. et al. | |
| 9,249,729 B2 | 2/2016 | Bacic | |
| 9,366,194 B2* | 6/2016 | Feigl | F02C 9/18 |

(Continued)

FOREIGN PATENT DOCUMENTS

WO    WO2015020892 A1 * 8/2014

*Primary Examiner* — Katheryn A Malatek
*Assistant Examiner* — Alyson Joan Harrington
(74) *Attorney, Agent, or Firm* — Carlson, Gaskey & Olds, P.C.

(57) ABSTRACT

A gas turbine engine includes a compressor section, a combustor, and a turbine section. The turbine section includes a high pressure turbine comprising a plurality of turbine blades. The gas turbine engine includes a tap for tapping air that is compressed by the compressor, to be passed through a heat exchanger to cool the air, the cooled air to be passed to the plurality of turbine blades. A sensor is located downstream of a leading edge of the combustor, and is configured to measure a characteristic of the cooled air. A controller is configured to compare the measured characteristic to a threshold and control an operating condition of the gas turbine engine based on the comparison.

2 Claims, 4 Drawing Sheets

(56) References Cited

U.S. PATENT DOCUMENTS

| | | | |
|---|---|---|---|
| 9,945,248 B2* | 4/2018 | McCaffrey | F01D 5/081 |
| 10,196,928 B2* | 2/2019 | Adibhatla | F01D 21/003 |
| 2006/0285968 A1* | 12/2006 | Riahi | F01D 5/081 |
| | | | 415/115 |
| 2014/0208768 A1* | 7/2014 | Bacic | F01D 5/082 |
| | | | 60/782 |
| 2014/0250898 A1 | 9/2014 | Mackin et al. | |
| 2015/0059355 A1* | 3/2015 | Feigl | F02C 9/18 |
| | | | 60/782 |
| 2015/0275690 A1* | 10/2015 | McCaffrey | F01D 5/081 |
| | | | 416/1 |
| 2015/0275758 A1 | 10/2015 | Foutch et al. | |
| 2015/0322866 A1 | 11/2015 | Scipio et al. | |
| 2017/0254216 A1* | 9/2017 | Adibhatla | F01D 21/003 |
| 2018/0128178 A1 | 5/2018 | Snape et al. | |

* cited by examiner

GAS TURBINE ENGINE CONTROL BASED ON CHARACTERISTIC OF COOLED AIR

BACKGROUND

This application relates to the supply of high pressure cooling air to turbine blades.

Gas turbine engines are known and typically include a fan delivering air into a bypass duct for propulsion. The fan also delivers air into a compressor where air is compressed and delivered into a combustor. The air is mixed with fuel and ignited. Products of this combustion pass downstream over turbine rotors driving them to rotate. The turbine rotors, in turn, rotate compressor rotors and the fan rotor.

As can be appreciated, many components in the turbine section see very high temperatures. One such component includes turbine blades of the high pressure turbine which are downstream of the combustor.

Traditionally, a turbine rotates at the same speed as the fan rotor. More recently, it has been proposed to include a gear reduction between a fan drive turbine and the fan rotor. With this change, the pressures and temperatures seen across the turbine sections have increased.

The turbine blades are provided with cooling air. To drive cooling air into the turbine, the cooling air must be at a higher pressure than in the past. Thus, the cooling air is typically tapped from a high pressure location.

It has been proposed to pass the cooling air through a heat exchanger prior to being delivered into the turbine section for cooling.

SUMMARY

One example embodiment of a gas turbine engine includes a compressor section, a combustor, and a turbine section. The turbine section includes a high pressure turbine having a plurality of turbine blades. The gas turbine engine includes a tap for tapping air that is compressed by the compressor, to be passed through a heat exchanger to cool the air, the cooled air to be passed to the plurality of turbine blades. A sensor is located downstream of a leading edge of the combustor, the sensor configured to measure a characteristic of the cooled air. A controller is configured to compare the measured characteristic to a threshold and control an operating condition of the gas turbine engine based on the comparison.

In another example embodiment of the above described gas turbine engine, the cooled air passes to the plurality of turbine blades via a flow path situated radially inward of the combustor.

In another example embodiment of any of the above described gas turbine engines, the cooled air passes into a mixing chamber where it is mixed with air from a diffuser chamber prior to being passed to the plurality of turbine blades, the diffuser chamber situated radially outwardly of said combustor.

In another example embodiment of any of the above described gas turbine engines, the gas turbine engine includes a tangential on-board injector (TOBI) configured to provide the cooled air from a flow path to the plurality of turbine blades, wherein the sensor is located between an outlet of the TOBI and a position axially aligned with a leading edge of the combustor.

In another example embodiment of any of the above described gas turbine engines, the sensor is located within the TOBI.

In another example embodiment of any of the above described gas turbine engines, to control the operating condition of the gas turbine engine, the controller is configured to maintain a current engine operating mode if the measured characteristic does not exceed the threshold, and cause the gas turbine engine to enter a low power mode based on the measured characteristic exceeding the threshold.

In another example embodiment of any of the above described gas turbine engines, the measured characteristic includes a temperature of the cooled air.

In another example embodiment of any of the above described gas turbine engines, the measured characteristic is an air pressure of the cooled air.

In another example embodiment of any of the above described gas turbine engines, the measured characteristic includes a ratio of an air pressure of the cooled air to an air pressure of air downstream of the combustor, or a ratio of a temperature of the cooled air to a temperature of air downstream of the combustor.

In another example embodiment of any of the above described gas turbine engines, the gas turbine engine includes an additional sensor situated in a rim cavity downstream of the combustor, wherein the additional sensor is configured to measure one of the air pressure and the temperature of air downstream of the combustor.

In another example embodiment of any of the above described gas turbine engines, to control the operating condition of the gas turbine engine, the controller is operable to perform a valve adjustment that increases an amount of the cooled air flowing to the plurality of turbine blades or increases an amount of tapped air that is passed through the heat exchanger.

In another example embodiment of any of the above described gas turbine engines, the controller is operable to subsequently cause the gas turbine engine to enter a low power mode based on the measured characteristic exceeding the threshold after the valve adjustment.

One example embodiment of a method of controlling an operating condition of a gas turbine engine includes tapping air that is compressed by a compressor of the gas turbine engine, passing the tapped air through a heat exchanger that cools the air, and sending the cooled air to plurality of turbine blades in a high pressure turbine section of the gas turbine engine. The method also includes measuring a characteristic of the cooled air using a sensor located downstream of a leading edge of a combustor of the gas turbine engine, comparing the measured characteristic to a threshold, and controlling an operating condition of the gas turbine engine based on the comparison.

In another example embodiment of the above described method, providing the cooled air to the plurality of turbine blades in the high pressure turbine section includes passing the air through a tangential on-board injector (TOBI).

In another example embodiment of any of the above described methods, controlling an operating condition of the gas turbine engine based on the comparison includes maintaining a current engine operating mode if the measured characteristic does not exceed the threshold, and causing the gas turbine engine to enter a low power mode based on the measured characteristic exceeding the threshold.

In another example embodiment of any of the above described methods, measuring a characteristic of the cooled air includes measuring a temperature or air pressure of the cooled air.

In another example embodiment of any of the above described methods, measuring a characteristic of the cooled air includes determining a ratio of the air pressure of the cooled air to an air pressure of air downstream of the combustor, or determining a ratio of the temperature of the cooled air to a temperature of air downstream of the combustor.

In another example embodiment of any of the above described methods, the method includes measuring the air pressure of air downstream of the combustor using an additional sensor that is situated in a rim cavity downstream of the combustor.

In another example embodiment of any of the above described methods, controlling the operating condition of the gas turbine engine includes performing a valve adjustment that increases an amount of the cooled air flowing to the plurality of turbine blades or increases an amount of tapped air that is passed through the heat exchanger.

In another example embodiment of any of the above described methods, the method includes subsequently causing the gas turbine engine to enter a low power mode based on the measured characteristic exceeding the threshold after the valve adjustment.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
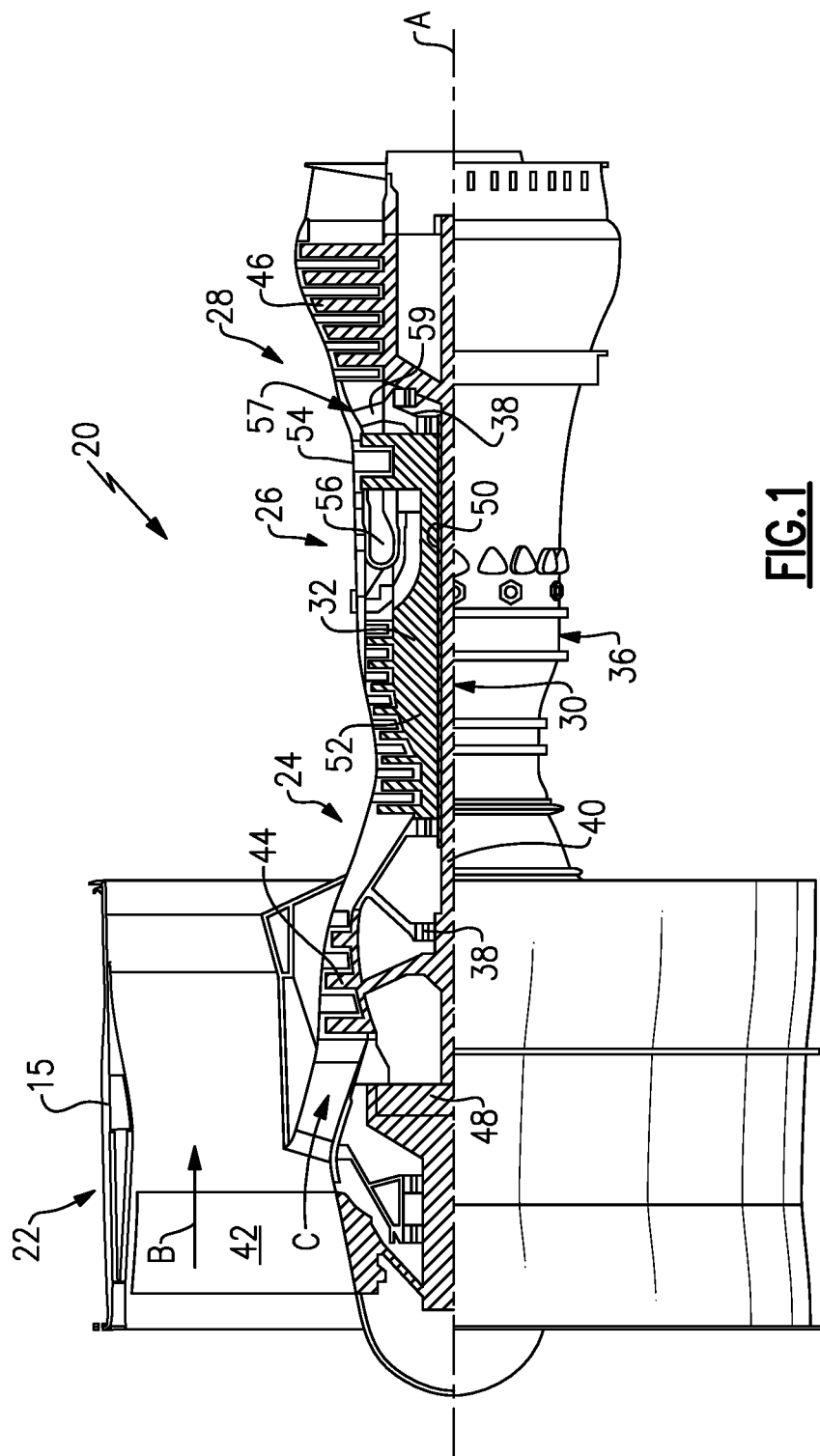
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. Alternative engines might include an augmentor section (not shown) among other systems or features. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of 1 bm of fuel being burned divided by 1 bf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 meters/second).

Figure 2A:
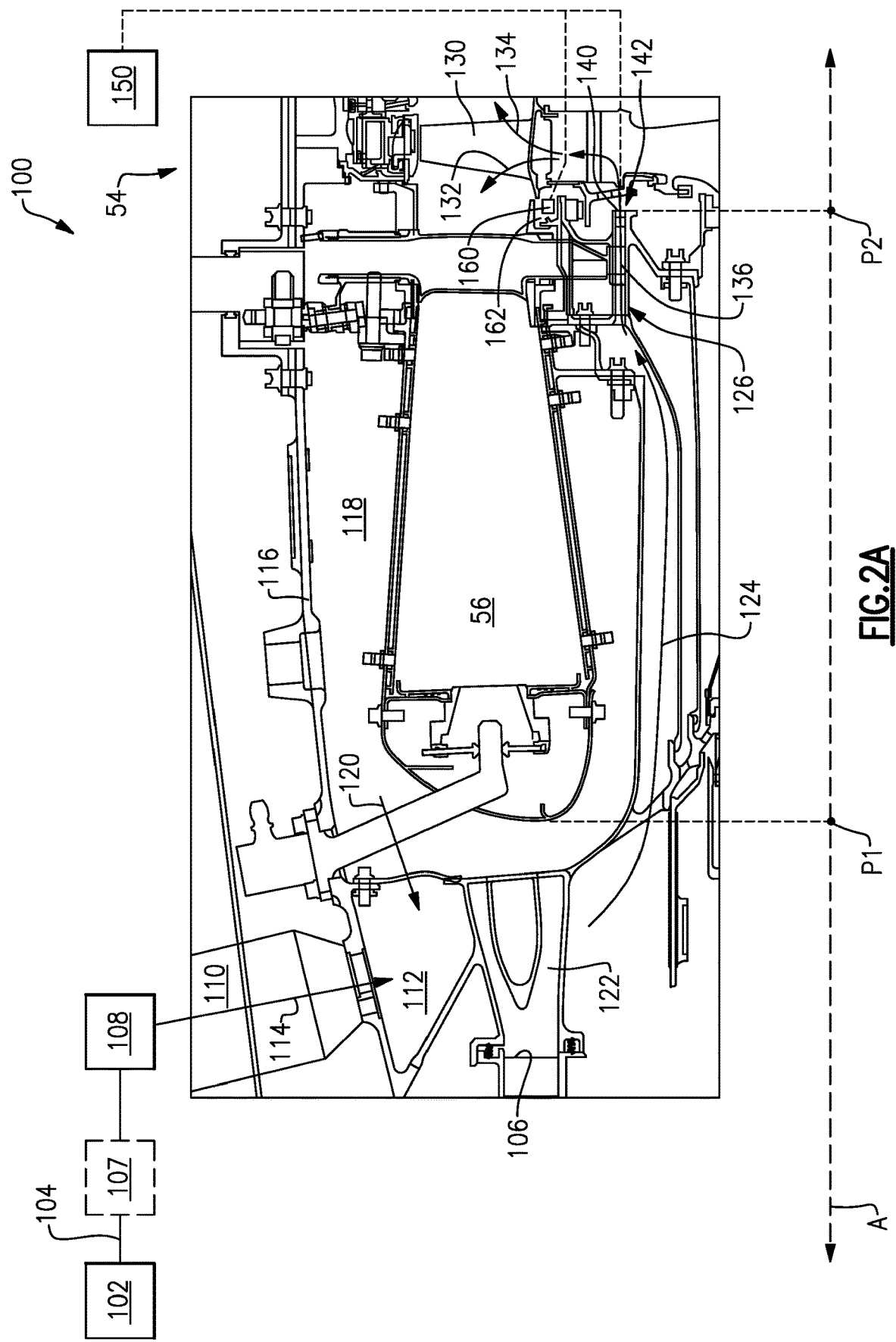
FIG. 2A is a schematic view of a cooling system for cooling turbine components.

FIG. 2A shows a cooling system 100 for cooling turbine components. As shown, a compressor section 102 is provided with a tap 104 for tapping pressurized air. The tap 104 may be at a location upstream from a location 106 that is a downstream most portion of the high pressure compressor 52, in which case, it is typically provided with a boost compressor to raise its pressure. Alternatively, the air can be tapped from a location downstream of location 106 where it has been fully compressed by the high pressure compressor 52.

In either case, pressurized air passes through a heat exchanger 108 where it is cooled, such as by air. In one embodiment, the heat exchanger 108 may be in the bypass duct as described in FIG. 1. In another example, the heat exchanger 108 is not in the bypass duct, and a valve 107 is operable to control how much air flows to the heat exchanger 108 to be cooled.

As shown in FIG. 2A, cooled air downstream of the heat exchanger 108 passes into one or more conduits 110 and then into a mixing chamber 112. This flow of cooled air is shown schematically with arrow 114. Although only one conduit 110 is depicted in FIG. 2, in some examples a plurality of the tube conduits 110 are circumferentially spaced about the outer circumference of outer core housing 116 to supply the desired cooled air.

Air from a diffuser case or chamber 118, outward of combustor 56, passes into the mixing chamber 112 (shown schematically with arrow 120) and mixes with the high pressure cooled air downstream of heat exchanger 108. In this manner, the cooled air is raised to a pressure and temperature closer to that needed to cool the turbine section 28.

The air in chamber 118 is downstream of the location 106 which corresponds to downstream most end of the high pressure compressor 52. The chamber 118 is defined at an outward location by the outer core housing 116.

The mixing chamber 112 is radially outward of a compressor diffuser 122, and the mixed air from flows 114, 120 passes through vanes in the compressor diffuser 122 such that it is kept separate from air downstream of location 106.

The air downstream of mixing chamber 112 passes into a path flow 124 radially inwardly of both the outer core housing 116 and the combustor 56, and through a tangential on-board injector (TOBI) 126 to cool one or more turbine blades 130 in the high pressure turbine section 54 of the gas turbine engine 20. The TOBI 126 is an annular structure that changes an angle of exit for the cooling air that is delivered to the one or more turbine blades 130.

In some examples, after flowing through the TOBI 126, the cooled air flows into holes in the turbine blade 130 and out of the turbine blade 130 in a fore and/or aft direction (shown schematically with arrows 132, 134). Optionally, the TOBI 126 may include an annular valve 136 operable to control how much cooled air flows through the TOBI 126. The annular valve 136 is shown in the enlarged schematic view of the TOBI 126 in FIG. 2B. In addition or as an alternative to the annular valve 136, in some examples valve 107 is include to control how much air flows to the heat exchanger 108 to be cooled.

If the heat exchanger 108 malfunctions, the flow 114 of cooled air may be insufficiently cooled, which could lead to overheating of the turbine blade 130. Also, if an air pressure of the flow path 124 as it exits the TOBI 126 is too low, instead of receiving cooled air into its interior, the one or more turbine blades 130 may instead receive a backflow of heated air emitted from the combustor 56, which could also lead to overheating of the turbine blade(s) 130. Either of these scenarios could potentially shorten the life of the turbine blade(s) 130.

To avoid overheating the one or more turbine blades 130, a sensor 140 is configured to measure a characteristic of the cooled air in or entering the TOBI 126. The sensor 140 is operable to communicate with controller 150 (e.g., a full authority digital engine control "FADEC") which compares the measured characteristic to a threshold and controls an operating condition of the gas turbine engine 20 based on the comparison.

In one example, the controller 150 maintains a current engine operating mode if the measured characteristic is does not exceed the threshold, and causes the gas turbine engine 20 to enter a low power mode (e.g., an idle mode or a cruise mode) based on the measured characteristic exceeding the threshold.

The "low power mode" restricts the gas turbine engine 20 to operation within only a portion of its normal parameters, such as temperature, rotor speed, and/or thrust, within which continued safe operation is practicable.

As used herein, and as discussed below in greater detail, "exceeding" can mean being greater than the threshold in some examples (e.g., a temperature-based measured characteristic), and can mean being less than the threshold in other examples (e.g., an air pressures-based measured characteristic).

Figure 2B:
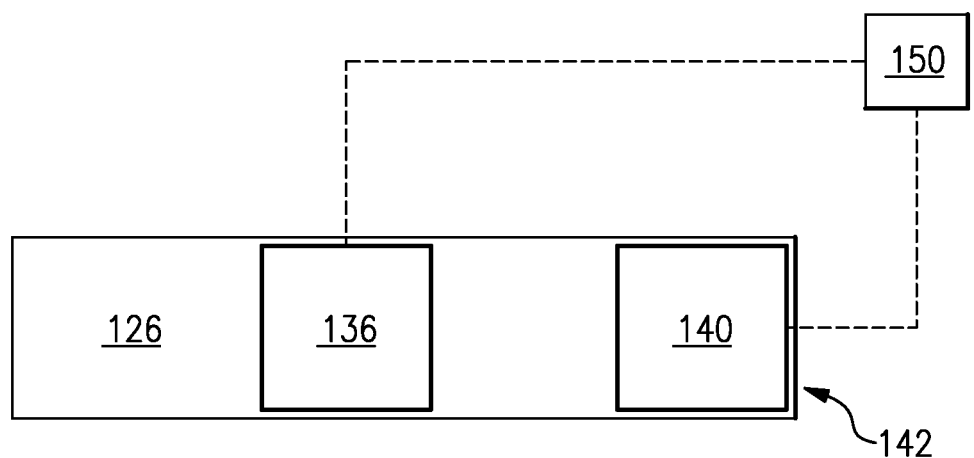
FIG. 2B is an enlarged schematic view of a tangential onboard injector (TOBI) of the cooling system of FIG. 2.

The sensor 140 is located downstream of a position P1, which is axially aligned with a leading edge of the combustor 56. In the example of FIGS. 2A and 2B, the sensor 140 is located within the TOBI 126 at the outlet 142 of the TOBI 126. However, other locations could be used, such as any other location within the TOBI 126, or any location along the flow path 124 between position P1 and position P2, which is axially aligned with the outlet 142 of the TOBI 126. The location shown in FIG. 2A, at the outlet of the TOBI 126, in some examples could provide the advantage of capturing the temperature adjustment of a cooling effect provided by air swirling within the TOBI 126. Of course, as discussed above, other sensor locations could be used.

In one example, the measured characteristic is based on a temperature of the air in or entering the TOBI 126, the threshold is a temperature threshold, and "not exceeding" the threshold means the temperature being less than the threshold. In one such example, the measured characteristic is the temperature itself, and in another example the measured characteristic is a ratio of the temperature of the cooled air to a temperature of air downstream of the combustor 56, and the threshold corresponds to a temperature ratio that is sufficient to cool the turbine blade 130. The temperature of the gas path air exiting the combustor 56 is measured by sensor 160 situated in rim cavity 162 in one example.

In another example, the measured characteristic is based on an air pressure of the air in or entering the TOBI 126. In one such example, the measured characteristic comprises a ratio of the air pressure of the air in or entering the TOBI 126 to an air pressure of air exiting the combustor 56, and the threshold corresponds to a pressure ratio that is sufficient to prevent so-called "backflow" where the turbine blade 130 ingests gas path air from the combustor 56 (e.g., a minimum backflow margin). The air pressure of the gas path air exiting the combustor 56 is measured by sensor 160 situated in rim cavity 162 in one example. In some examples in which the measured characteristic is based on air pressure, "not exceeding" the threshold means the air pressure value (e.g., the ratio) is greater than the threshold, such that the air pressure value for the cooled air exceeds the minimum backflow margin and prevents backflow of gas path air into the turbine blade(s) 130.

Although the sensor 160 has been described as being capable of measuring temperature and pressure, it is understood that it may be configured to measure only one of temperature and pressure, or may also measure additional parameters. Also, it is understood that in some examples the sensor 160 may be omitted.

In one example, to control the operating condition of the gas turbine engine 20, the controller 150 is operable perform an adjustment of valve 136 in an attempt to increase an amount of cooled air exiting the TOBI 126 and/or to perform an adjustment of valve 107 in an attempt to increase an amount of tapped air passing through the heat exchanger 108. In a further example, the controller 150 is operable to subsequently cause the gas turbine engine 20 to enter a low power mode based on the measured characteristic exceeding the threshold after the valve adjustment (e.g., continuing to exceed the threshold after a time period has elapsed after the valve adjustment).

Figure 3:
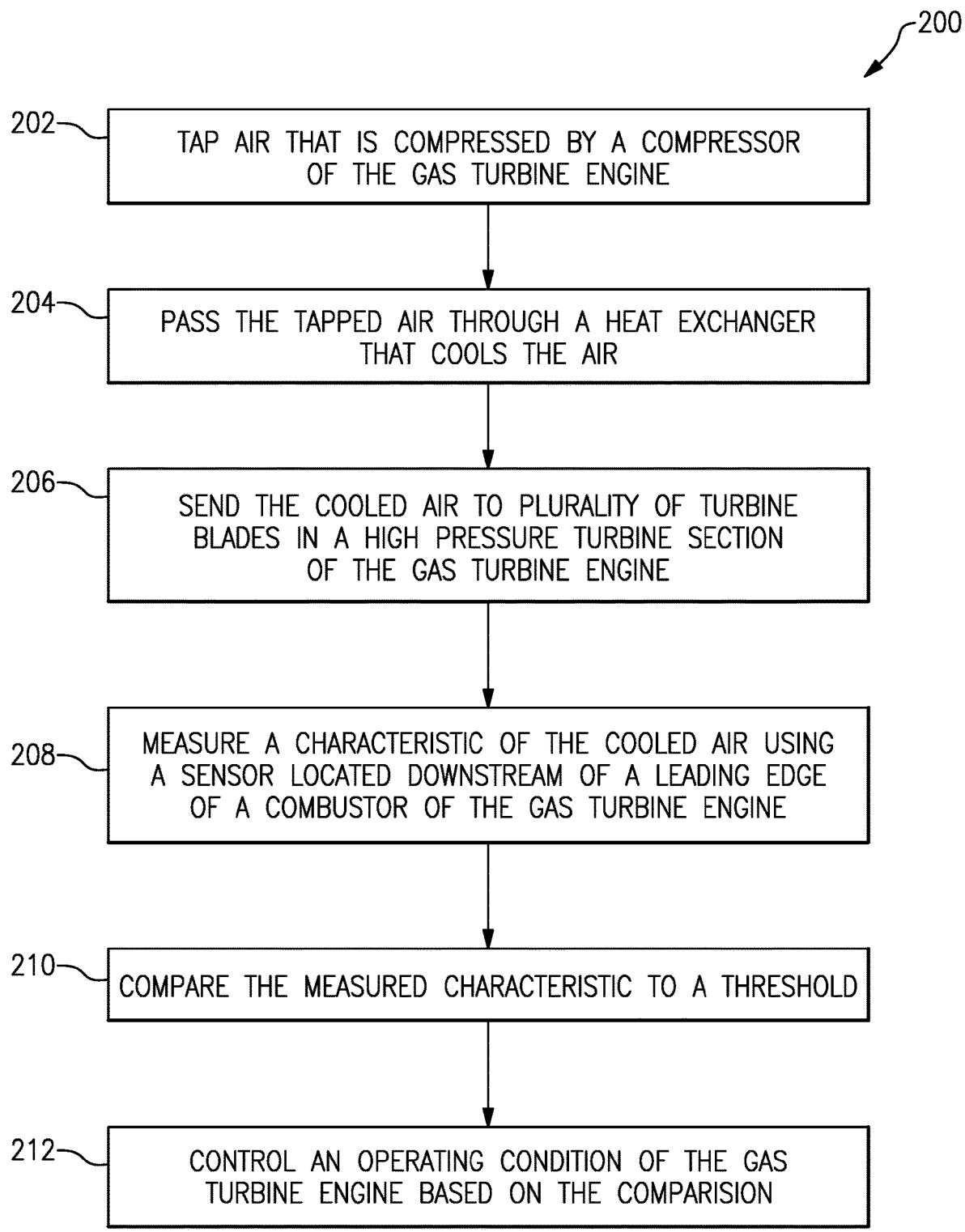
FIG. 3 schematically illustrates an example method of controlling an operating condition of a gas turbine engine.

FIG. 3 schematically illustrates an example method 200 of controlling an operating condition of a gas turbine engine 20. Air that is compressed by a compressor (e.g., compressor stage 102) of the gas turbine engine 20 is tapped (block 202), and the tapped air is passed through a heat exchanger 108 that cools the air (block 204). The cooled air is sent to plurality of turbine blades 130 in a high pressure turbine 54 section of the gas turbine engine 20 (block 206). A characteristic of the cooled air is measured using a sensor 140 located downstream of a leading edge of the combustor 56 of the gas turbine engine 20 (see position P1) (block 208). The measured characteristic is compared to a threshold (e.g., a temperature or air pressure threshold) (block 210), and an operating condition of the gas turbine engine 20 is controlled based on the comparison (block 212).

As discussed above, in some examples controlling the operating condition of the gas turbine engine 20 based on the comparison includes maintaining a current engine operating mode if the measured characteristic does not exceed the threshold, and causing the gas turbine engine to enter a low power mode based on the measured characteristic exceeding the threshold.

Also, as discussed above, in some examples controlling the operating condition of the gas turbine engine 20 (block 212) includes performing a valve adjustment of valve 136 to increase an amount of cooled air exiting the TOBI 126 and/or performing an adjustment of valve 107 to increase an amount of tapped air passing through the heat exchanger 108. In a further example, the method 200 includes subsequently causing the gas turbine engine 20 to enter a low power mode based on the measured characteristic still exceeding the threshold after the valve adjustment (e.g., continuing to exceed the threshold after a time period has elapsed after the valve adjustment).

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. A method of controlling an operating condition of a gas turbine engine comprising:
   tapping air that is compressed by a compressor of the gas turbine engine;
   passing the tapped air through a heat exchanger that cools the air;
   sending the cooled air to a plurality of turbine blades in a high pressure turbine section of the gas turbine engine;
   measuring a characteristic of the cooled air using a sensor located downstream of a leading edge of a combustor of the gas turbine engine;
   comparing the measured characteristic to a threshold; and
   controlling the operating condition of the gas turbine engine based on the comparison, said controlling comprising:
      maintaining a current engine operating mode if the measured characteristic does not exceed the threshold; and
      causing the gas turbine engine to enter a low power mode based on the measured characteristic exceeding the threshold, wherein the low power mode restricts the gas turbine engine to operation within a portion of its normal parameters for at least one of temperature, rotor speed, and thrust, and wherein the low power mode comprises an idle mode or a cruise mode.

2. A gas turbine engine comprising:
   a compressor section, a combustor, and a turbine section;
   said turbine section including a high pressure turbine comprising a plurality of turbine blades;
   a tap for tapping air that is compressed by said compressor, to be passed through a heat exchanger to cool the air, the cooled air to be passed to the plurality of turbine blades;
   a sensor located downstream of a leading edge of the combustor, the sensor configured to measure a characteristic of the cooled air; and
   a controller configured to:
      compare the measured characteristic to a threshold;
      maintain a current engine operating mode if the measured characteristic does not exceed the threshold; and
      cause the gas turbine engine to enter a low power mode based on the measured characteristic exceeding the threshold, wherein the low power mode restricts the gas turbine engine to operation within a portion of its normal parameters for at least one of temperature, rotor speed, and thrust, and wherein the low power mode comprises an idle mode or a cruise mode.

* * * * *